United States Patent [19]

Rischar et al.

[11] Patent Number: 5,636,124

[45] Date of Patent: Jun. 3, 1997

[54] MULTITASKING INDUSTRIAL CONTROLLER

[75] Inventors: Charles M. Rischar, Chardon; David R. Rohn, Willoughby Hills; David A. Johnston; Raymond Husted, both of Mentor, all of Ohio

[73] Assignee: Allen-Bradley Company, Inc., Milwaukee, Wis.

[21] Appl. No.: 399,074

[22] Filed: Mar. 8, 1995

[51] Int. Cl.⁶ .............. G06F 19/00; G06F 7/64; G06F 7/66; G06G 7/64; G06G 7/66

[52] U.S. Cl. .............. 364/468.06; 364/468.05; 364/468.07; 364/469.01; 395/651; 395/670

[58] Field of Search .............. 364/468, 469, 364/467, 200, 468.05, 468.06, 468.07; 395/650

[56] References Cited

U.S. PATENT DOCUMENTS 4,736,318  4/1988  Delyani et al. .............. 364/200
5,193,189  3/1993  Flood et al. .............. 395/650
5,339,425  8/1994  Vanderah et al. .............. 395/700

*Primary Examiner*—Paul P. Gordon
*Assistant Examiner*—Ramesh Patel
*Attorney, Agent, or Firm*—Keith M. Baxter; John M. Miller; John J. Horn

[57] ABSTRACT

A multitasking industrial controller for real-time control of machinery and the like permits the use of both periodic and event driven tasks by establishing a hierarchy of both task types in the form of priorities that resolve conflicts between events of the same and different types. The unpredictability of the event driven tasks on scheduling of tasks is addressed by watchdog time values assigned to each task which confirm timely execution of the task in practice despite the risk of preemption by other tasks. Flexible software definition of event driven tasks is made possible by delegating the detection of the events to input/output modules executing independently of the processor executing the operating system.

12 Claims, 6 Drawing Sheets

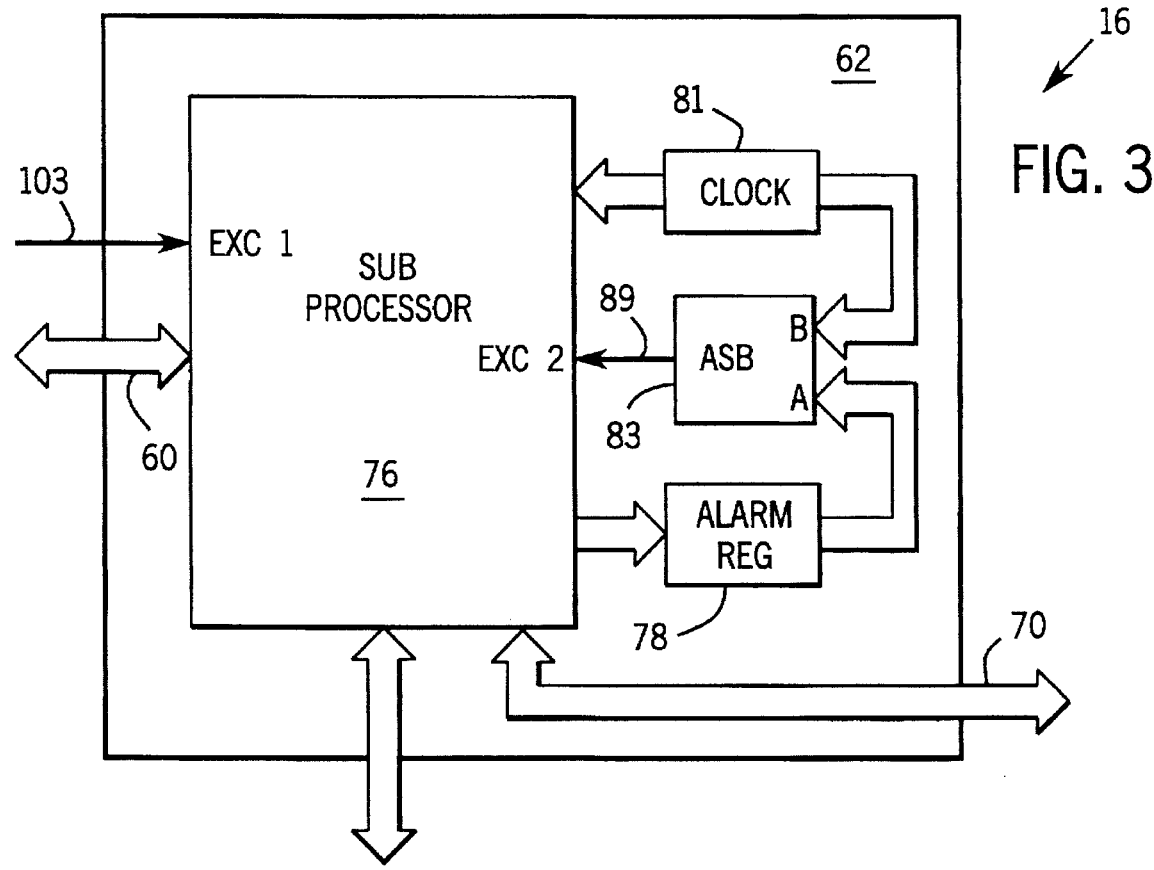

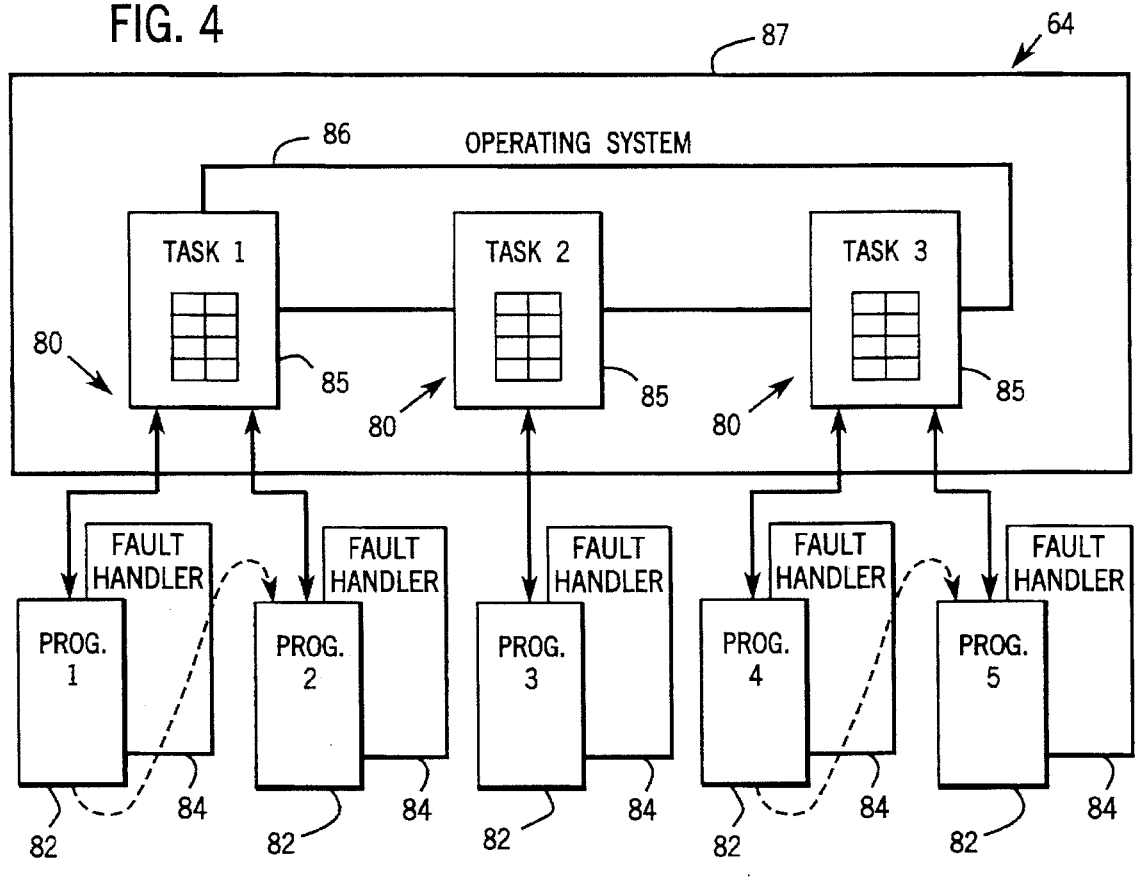

| TASK | PRIORITY |
|---|---|
| SLOW LOOP | 10 |
| FAULT | 6 |
| FILL | 8 |
| MAIN | 24 |

MULTITASKING INDUSTRIAL CONTROLLER

FIELD OF THE INVENTION

The present invention relates to industrial controllers for the "real-time" control of industrial processes, and in particular, to an operating system for an industrial controller that allows multiple tasks to be executed with apparent simultaneity.

BACKGROUND OF THE INVENTION

Industrial controllers are special purpose computers used for controlling industrial processes or manufacturing equipment.

Under the direction of a stored program, the industrial controller examines a series of inputs reflecting the status of a controlled process and changes outputs effecting control of the process. The inputs and outputs are most simply binary, that is "on" or "off"; however, analog inputs and outputs, taking on a continuous range of values, are also used.

Industrial controllers are frequently programmed in a "relay ladder" language where instructions are represented graphically by "contacts" and "coils" of virtual relays connected and arranged in ladder-like rungs. This relay ladder language, with its input contacts and output coils, reflects the emphasis in industrial control on the processing of large amounts of input and output data. The relay ladder language also reflects the fact that most industrial control is "real-time"; that is, an ideal industrial controller behaves as if it were actually composed of multiple relays connected in parallel rungs to provide outputs in essentially instantaneous response to changing inputs.

Other industrial control languages are also used including: function block languages which represent instructions as functional blocks having inputs and outputs connected to the inputs of other functional blocks; sequential function chart languages which represent the control process as a series of discrete states responsive to historical input and output data, and structured text languages which most closely resemble conventional computer programs such as FORTRAN and C.

Unlike programs written for industrial control, conventional computer programs frequently contain instructions causing loops in their execution pending an external event, for example, where the processor repeats a test instruction until an input condition is satisfied. Such loops can cause the execution time of the program to vary substantially, depending on how soon the external condition is satisfied.

In contrast, programs written for real-time control normally are fashioned to have a well defined execution time as they cycle through the program from beginning to end. This is a result, in part, of the need for these programs to process many inputs and outputs concurrently. If the processor "waits" for one input, e.g. by looping, this waiting adversely affects the speed of the processing of the other inputs.

For a control program written in ladder form, for example, the program continuously scans the "rungs" of the ladder reading inputs and writing outputs determined from those inputs and the logic of the ladder. The scanning time is relatively constant.

It would be desirable to write large programs for industrial controllers as separate "tasks" that could be independently run and checked. For example, different machines along a single assembly line might be controlled with separate programs, each written as a separate task. The tasks for different machines, although developed separately, could then run on a single processor in a manner so as to appear to be executing simultaneously. Apparent simultaneous execution would be obtained by rapidly switching a single processor between tasks.

It is known to run multiple "periodic" tasks, i.e, tasks that must be run at a regular defined interval, on a single processor by switching between the tasks based on a schedule. The schedule is designed to accommodate the desired frequency with which the task should be run (its "period"), the latter which is chosen to satisfy the demands of the process it controls. Tasks controlling rapidly changing processes would tend to have shorter periods.

One scheduling system, termed "rate monotonic", for example, reviews each task to be run and the periods of those tasks and runs the ready task, as determined by each task's last running time, also having the shortest period. Other well known scheduling algorithms such as "earliest deadline first" and "least laxity first" employ different criteria to order the ready tasks for running. Provided the execution times and the periods of the tasks are well known, each of these scheduling systems can provide efficient use of the processor while ensuring that no periodic task misses its deadline. These scheduling methods give the programmer considerable flexibility in defining a control process as multiple periodic tasks.

Unfortunately, the above scheduling methods are not well suited to tasks that are not periodic, i.e., tasks that need to run only infrequently as triggered by some external occurrence that does not have a regular period. If such tasks are treated as periodic, so as to be included in the schedule, the period must be short to accommodate the need for rapid detection of the event triggering the task and prompt initiation of the task once it is triggered. This short period means that during many of those scheduled periods for the task, the task will not have been triggered and will not need to execute. Thus, processor time is wasted.

These event driven tasks that need only be executed when a certain event occurs are better accommodated with a hardware interrupt system. In one form of such a system, a signal on a physical interrupt line to the processor causes the processor circuitry to suspend its current task and jump to a new task identified by an "interrupt vector" stored in the processor's memory.

This hardware approach avoids the need to have the processor spend any time reading an input to determine whether the processor should start a new task. But, by the same token, hardware interrupt systems are inflexible and not readily modified through programming alone and thus limit the flexibility of the programmer to divide a control process into arbitrary tasks. Hardware interrupt systems are cumbersome when the relationship between tasks and triggering events is complex, i.e., where one event triggers multiple tasks or one task is triggered by multiple events.

SUMMARY OF THE INVENTION

The present invention provides a real-time control system for running multiple tasks that successfully integrates both periodic and event driven tasks so that each may be flexibly implemented by a user of the system solely through the programming of the system.

The industrial controller includes an I/O module receiving electrical inputs and outputs connected to controlled equipment and a control terminal, provided for entering data from the user, permitting entry of task scheduling information including the identification of a task priority for each task to be executed by the controller and a task type, either periodic or event. For periodic tasks, a task periodicity value is entered and for event-driven tasks, a change in one electrical input or output is identified as a source of the event. An electronic memory holds task programs, the task scheduling information provided by the user, and an operating system for controlling the execution of the tasks.

An electronic processor, operating according to the task scheduling information and the operating system, executes the tasks by determining a highest priority periodic or event triggered task requiring current execution, based on the task priority and the task periodicity values or occurrence of an event, and executes that highest priority task once from its starting point to its completion point unless an event occurs associated with a task of higher priority. Other tasks are suspended.

It is thus one object of the invention to provide a multi-tasking operating system that permits the arbitrary mixing of event driven and periodic tasks under software control. The use of a priority system for both periodic and event driven tasks mediates between conflicting periodic and/or event tasks.

The task trigger type may also include a continuous type where the electronic processor executes the tasks of the continuous type if no event type or periodic type tasks are being executed.

It is thus another object of the invention to provide a low priority continuous task that does not interfere with higher priority tasks if such tasks are pending and yet that would typically obtain some processing time. Because each higher priority event or periodic task is limited to one execution of the task per its triggering, lower priority tasks and, in particular, the continuous task will obtain some processor time despite the existence of higher priority tasks.

The data from the user may also include a separate watchdog time value associated with each program to be executed by a task. The electronic processor executing the operating system provides an error signal if any program being executed by a periodic task does not reach its completion within the watchdog time value after it requires execution, as indicated by its periodicity value, or if a program being executed by an event task does not reach its completion point within the watchdog time value for that program after the occurrence of its event.

Thus, it is another object of the invention to allow the user to flexibly mix predictable periodic tasks with unpredictable event driven tasks without the risk of an undetected overloading of the processor causing failure of the control system. The ability to assign watchdog times to programs is possible in the real-time control area wherein execution times for all tasks are relatively stable. Thus, a periodic task which is repeatedly interrupted by event driven tasks and thus fails to complete within the watchdog time will be detected by the user from the error signal generated.

The events, for event triggered tasks based on changes in input and output values, may be identified by the I/O module receiving a portion of the data from the user that identifies the change in an electrical input or output as a source of an event. Once such a change is detected, the I/O modules provide a signal to the electronic processor causing an interruption of its operation.

Thus, it is another object of the invention to permit software definition of event driven tasks, the latter being completely flexible as to the source of the event while minimizing the basic hardware requirements. By delegating the event detection to I/O modules, no processor time is required to detect an event based on any one of the inputs and outputs available to the processor even though the detection is done by software. Generally, as the number of inputs and outputs increases, the number of I/O modules will also increase thus naturally providing additional resources for event driven tasks as the complexity of the input and output structure rises.

Each event is assigned an event identification number (ID) and event triggered tasks are conditioned upon an occurrence of an event with a specific event ID. More than one event can use the same event ID and more than one task can be conditioned on the same event ID. Events may also be generated internally by other tasks or other controllers coordination actions with a given controller.

Thus, it is another object of the invention to permit the relationship between tasks and events to be flexibly configured.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 3 is a more detailed block diagram of the processor of the controller of FIG. 2 showing the implementation of an alarm timer used for the multitasking scheduling;

FIG. 4 is a schematic representation of the multiple tasks and their associated programs in the memory of the controller of FIG. 1, each program having an associated fault handler;

FIG. 5 is a task scheduling table providing information entered by the user used for scheduling the tasks to make best use of the processor resources;

FIG. 6 is a schedule list produced by the present operating system and used to program the alarm of FIG. 3 for the multitasking of the controller of FIG. 1;

DETAILED DESCRIPTION OF THE PREFERRED EMBODIMENT

Figure 1:
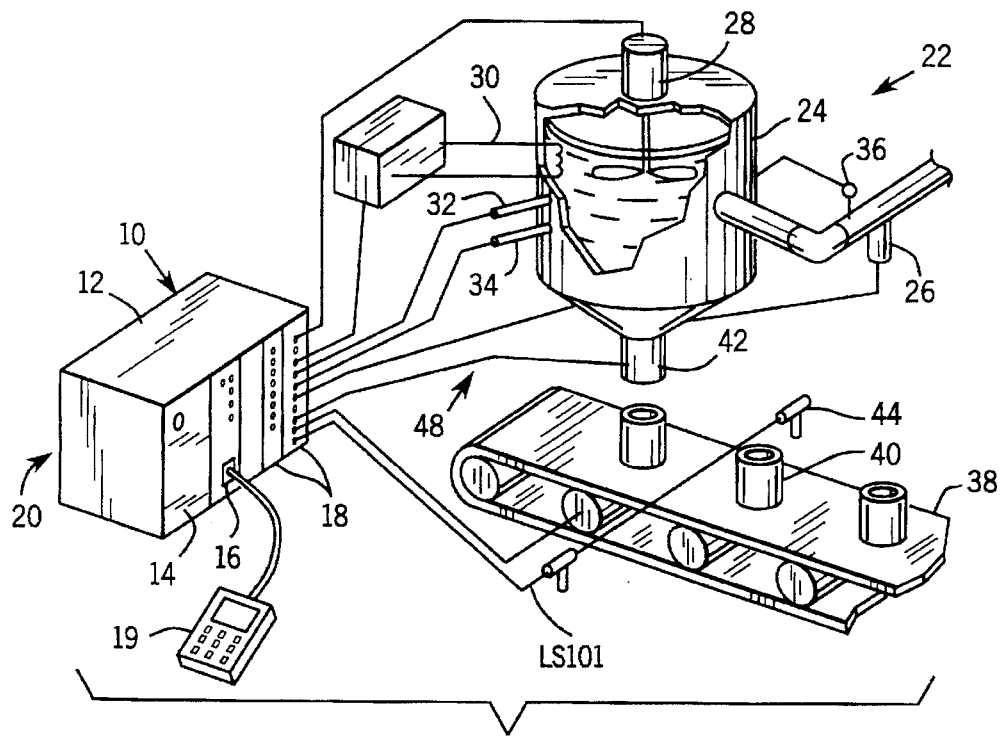
FIG. 1 is a perspective view of a simplified industrial control application including control of a conveyor line and a mixing tank as may be controlled by one industrial controller employing the multitasking operating system of the present invention.

Referring now to FIG. 1, the multitasking operating system of the present invention permits an automation controller 10 to execute with apparent simultaneity a number of different tasks associated with the controlled equipment 22. In the process shown, the automation controller 10 is connected to a mixing tank 24 where it controls the flow of materials into the tank via a valve 26 and the temperature and agitation of those materials via an agitator 28 and a heater 30 under feedback control via signals obtained from a thermocouple 32, a pressure transducer 34 and a flow sensor 36. Thus, the temperature of the material contained in the tank 24 may be regulated in a feedback loop by means of the thermocouple 32 and the heater 30. Likewise the flow may be regulated in a feedback loop with valve 26 and flow sensor 36. An additional feedback loop may regulate the pressure within the tank 24 as a more complex function of temperature and flow rate.

Figure 2:
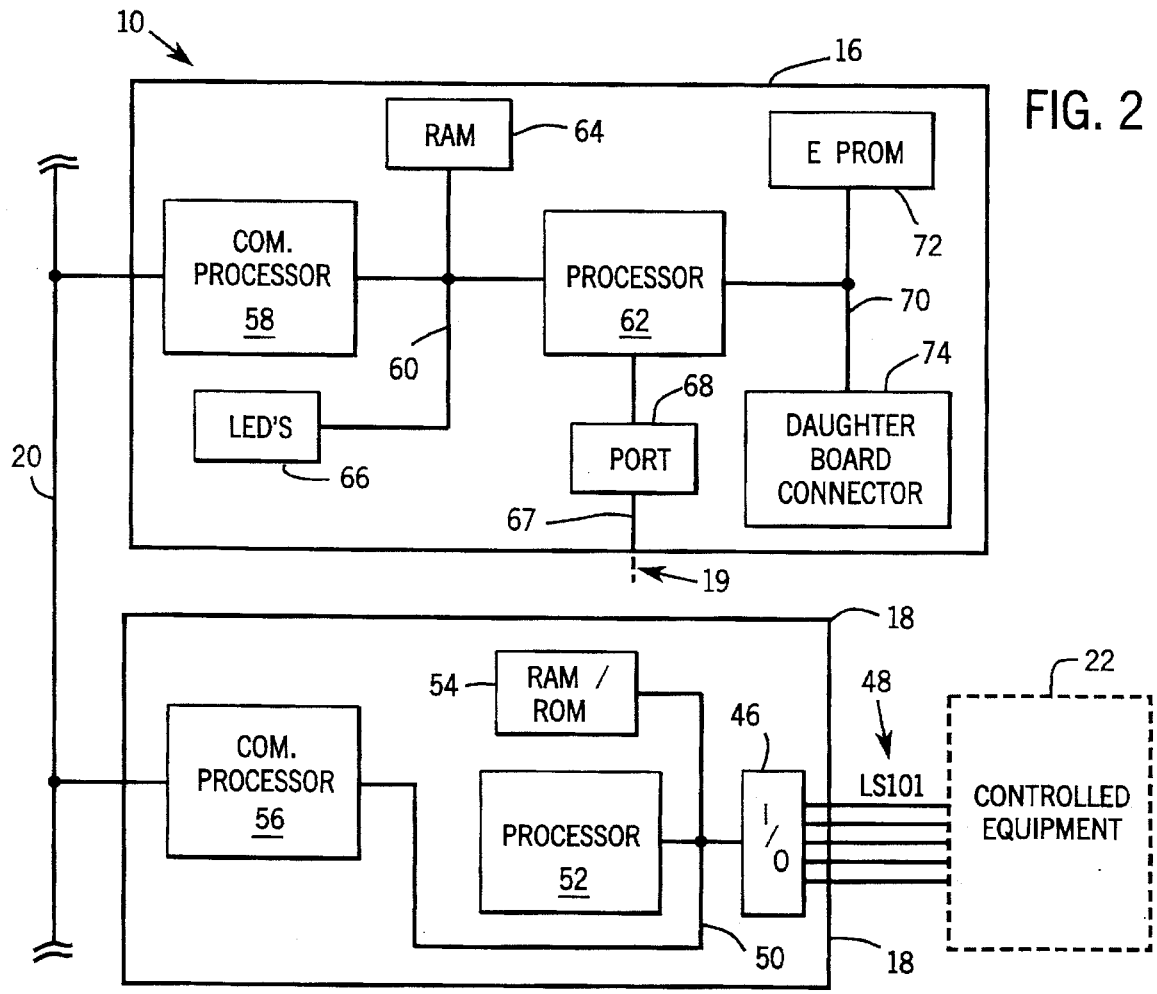
FIG. 2 is a block diagram of the controller of FIG. 1 showing the processor module, and I/O module, and the latter's connection to the controlled equipment of FIG. 1.

The automation controller 10 also controls, in the example, a conveyor belt 38 having cans 40 to be filled from the tank 24. The controller controls a spigot 42 from the tank 24 and the positioning of the conveyor belt 38 and receives signals from a limit switch 44 shown as a photoelectric beam so as to correctly position the containers under the spigot 42 for filling. Referring to FIG. 2, the signal lines 48 from the limit switch 44 (shown in FIG. 1) is designated LS1O1, and will be used to initiate a task as will be described below.

Referring now to FIGS. 1 and 2, an automation controller 10 includes generally a rack 12 holding one or more controller modules including a power supply 14, a processor module 16, and one or more input/output "I/O" modules 18 connected together via a backplane 20 passing along the rear of the rack 12. I/O modules such as 18 are generally known in the art and operate to receive signals and transmit them to the processor module 16 under the operation of their processor 52. The processor module 16 receives inputs from controlled equipment 22 via the input/output modules 18 and provides outputs to the controlled equipment 22 by those same input/output modules 18.

The signal lines 48 from the controlled equipment 22 are received by the I/O module 18 at interface circuitry 46. The interface circuitry 46 contains protection circuitry, such as optical isolators, and conversion circuitry, such as analog to digital or digital to analog circuitry, for converting the I/O signals 48 to digital representations that may be transmitted on an internal bus 50 of the I/O module 18.

The internal bus communicates with an I/O module processor 52, a memory unit 54 composed generally of random access and read-only memory (RAM/ROM) and a communication processor 56 connecting the I/O module 18 to a high speed backplane 20 for communication with other modules, and in particular, the processor module 16. Processor 52 thus may receive instructions and programming from the processor module 16 as will be described below. The I/O module 18 may be constructed according to methods well understood in the art.

A communication processor 58 in the processor module 16 handles the communication protocols of the high speed backplane 20 and relays information between that high speed backplane 20 and an internal bus 60 of the processor module 16. The internal bus 60 is also connected to the processor 62 of the processor module as well as random access memory ("RAM") 64 and a front panel LED display 66. The processor 62 provides a separate serial port 68 used for diagnostics and programming and another internal bus 70 communicating with erasable programmable read-only memory (EPROM) 72 and a daughter board connector 74 which may be used for memory expansion on a separate card.

Generally during operation, the processor 62 reads program instructions from the EPROM 72 and transfers data to and from RAM 64, that data representing desired inputs and outputs interchanged by the communication processor 58 with the I/O module 18 and thus with the controlled equipment 22. The general architecture and operation of the automation controller 10 thus far described will be familiar to those of ordinary skill in the art.

Referring now to FIG. 3, the processor 62 of the processor modules 16 incorporates specialized circuitry for providing an alarm signal to the processor 62 on a periodic basis without the need for software timing loops by the processor 62. Specifically, a subprocessor 76 of the processor 62 receiving a 32-bit time value from a clock 81 adds a predetermined timer interval to the value of the clock 81 and stores the sum in alarm register 78. When the value of clock 81 equals the value in the alarm register 78, a comparator 83 provides an exception signal 89 to the subprocessor 76 which serves to interrupt the subprocessor's execution of its program in EPROM 72 and causes the subprocessor to jump to a new program for execution, as will be described.

The subprocessor 76 is a custom integrated circuit adapted for rapid execution of industrial controller languages, however, it will be understood that the following invention will be equally applicable to general purpose microprocessors and is not dependent on particular details of the processor beyond those described here.

Referring now to FIG. 4, it is desirable, both for programming ease and processor efficiency, to divide a control program used to control the equipment 22 of FIG. 1 into a number of tasks 80. Each task 80, stored in memory 64, is a part of the entire control program for controlling equipment 22, divided according to a logical separation in control tasks determined by the programmer. For example, in the application of FIG. 1, the feedback loops controlling the mixing in tank 24 may be separate tasks from those controlling the conveyor belt 38. The feedback loops are distinct from the control of the conveyor belt to the extent that each is synchronized only loosely with the other and control physically separate equipment. Thus each can be developed separately. A further distinction between the process control of the feedback loops and the conveyor control is that the former is essentially free-running and requires little synchronization to outside events whereas the latter is episodic but needs a high degree of synchronization to outside events. The separation of a program into tasks reflecting these fundamental differences in character of the programming goal may be accommodated in the tasks scheduling system as will be described below.

Each task 80 includes a task control block 85 executed by the operating system 87 and one or more programs 82 within the RAM 64 or EPROM 72. The programs 82, as contained in RAM 64 or EPROM 72, need not be contiguous with particular tasks which refer to them. Generally, the task control block 85 includes: a name for identifying the task, pointers to one or more programs 82 associated with that task, and scheduling data as will be described below with respect to FIG. 5. The task control block 85 also identifies storage areas in RAM 64 used for storing values essential to resuming execution of the task 80, if the task 80 is interrupted, such as the contents of registers associated with subprocessor 76 and the location of the stack used by the subprocessor 76 in executing that task. This information from the registers and stack associated with the task are stored so when the task is resumed, there will be no loss of data necessary for the completion of the program.

As will be described in more detail below, the tasks 80 are run by the operating system 87 according to a schedule defined by the programmer from data entered into a task scheduling table 88. When a task 80 is invoked, a program associated with the task control block 85 begins execution of the programs 82 associated with the task 80 in sequence from a starting point to an ending point in each program. After the completion of each program 82, the program 82 returns control to the program of the task control block 85 so that completion of the program 82 within a certain period of time may be verified through a watchdog system as will also be described. The program of the task control block 85 then switches to the next program 82 of the task 80 so that the programs 82 seem to execute one after another.

Each program 82 is also associated with a local fault handler 84 which is executed when the processor 62 encounters a predefined error during the execution of that program 82. Such error conditions include arithmetic overflows and other errors well known in the computer field as well as watchdog timeouts to be described. A system fault handler 86 is also associated with all tasks 80.

If a fault occurs during a program 82, the local fault handler 84 which is associated with the program 82 is executed to process the fault. If the local fault handler 84 does not address the fault, (indicated by a failure to clear the fault condition register), the system fault handler 86 is invoked and if the fault is then not addressed, the automation controller 10 shuts down and ceases execution of the tasks and their associated programs. Thus, fault handling is closely tied to the context of the fault as deduced from the program. This approach permits faults to be treated differently during execution of different programs depending on how critical they are to the correct operation of that program. This approach further recognizes that for some industrial control processes it may be better to operate the system with the possibility of error caused by the faults than to shut the system down with the certainty of attendant high costs.

Referring now to FIGS. 1 and 5, data defining each task 80 may be entered by the programmer through the programming terminal 19, or other terminal based on the programmer's knowledge of the overall operation of the controlled equipment 22 and the particular tasks and their criticality. This data is received by a task scheduling table 88 and used by the task control blocks 85.

As represented schematically, the task scheduling table 88 includes columns indicating a task name, a task priority, a task scheduling type, the task trigger condition, the programs 82 associated with the task, and a watchdog time value. The significance of the data entered into each of these columns may be explained by reference to example tasks forming the rows of the task scheduling table 88 and used to control the equipment 22 of FIG. 1.

A first task 90 incorporates two programs named "TEMP PID" and "FLOW PID" which control the temperature and flow of material in the tank 24. These programs implement feedback loops using a proportional-integral-derivative "PID" control algorithms. Although these algorithms may be quite complex, temperature and flow are generally slowly varying quantities and thus the programs need not be invoked at a high rate. Thus, these programs contained in task 90 are entitled: "slow loops" in the first column of the task scheduling table 88.

Normally process control is extremely sensitive to control failures insofar as an entire batch of materials and the equipment processing it can be ruined. For example, failure to properly agitate and maintain temperature of a resin could conceivably cause the resin to solidify in the mixing container destroying both the resin commercial value and the container in which it is being mixed. For this reason, it may be desirable to make such process control tasks a high priority. Nevertheless, priority is relative to other tasks and in this example, the slow loops of task 90 are given a priority of 10 in the task scheduling table 88—a lower priority than any of the other programmer written tasks 80.

The scheduling of these programs of task 90 is periodic, that is, the user has entered data indicating that the task is periodic, i.e, that it should be performed periodically at a regular interval, in this case every 100 milliseconds as indicated in the condition column. This results from the fact that the control algorithms of task 90 require regular correction but need not be synchronized to an external event.

Each program of task 90 is also given a watchdog time value, in this case a 5 ms in the final column in the task scheduling table 88 of FIG. 5 indicating a period of time during which it is expected that the programs of TEMP PID and FLOW PID may be executed once from start to finish. This watchdog value is critical in the present multitasking insofar as it provides assurance that the highly variable event triggered tasks do not overtax the system resources.

As will be described, a timer holding the watchdog time runs after the program has begun regardless of whether the program has been interrupted by programs of other tasks and thus provides an ongoing indication of the amount of time taken to execute each program.

A second task 92 of the task scheduling table 88, entitled FAST LOOPS, incorporates a PRESSURE PID program which controls the pressure of the material within the tank 24. Here unlike the process programs of task 90, the controlled variable of pressure may change relatively quickly and thus the task is scheduled periodically on a 10 millisecond rate. It is nevertheless given a higher priority of 9 compared to the slow loops based on the relative importance of timely execution of these two tasks. Like the SLOW LOOPS task 90, the FAST LOOPS task 92 is periodic and has a watchdog time value of 5 ms.

A third task 94 entitled: FILL, in the task scheduling table 88 includes programs CAN STOP and CAN FILL that stop a can 40 underneath the spigot 42 and initiate a filling of the container from the tank 24. These tasks are required only when a can 40 has arrived at the tank 24 and thus there is no need to run this task 94 continuously as is done with SLOW LOOPS and FAST LOOPS tasks described above. Here therefore, the programmer has designated the FILL task 94 as an event triggered rather than periodically triggered task. Event triggered tasks are those which are only invoked upon the occurrence of an external event, such as a change in an input signal from the controlled equipment 22 rather than simply the passage of time. In this case, the condition for the triggering is a closure of the limit switch 101 I/O line indicating a true state as indicated in the task scheduling table 88. This event is identified by an event ID sent by an I/O module as will be described. More than one event ID can be entered here, causing the task to be triggered by either of the events, and two or more tasks can have the same triggering event ID.

For this task 94, in contrast to the process loops tasks described above, although the can filling process is relatively slow, the program that must be run upon a can being detected is fast, requiring no complex computations and therefore the watchdog value can be 1 millisecond. Note that the programs CAN STOP and CAN FILL are written so as not to loop and wait while the can is filling. The fill task 94 is given a priority of 8.

A fourth task 98 designated MAIN includes a program AGITATOR CHECK and MAINTENANCE LOG, which in the example of FIG. 1, check the operation of the agitator 28 to see that it is working and log the hours of equipment usage in a table for maintenance purposes. These tasks essentially need to run continuously but have no strong demands of a particular period of execution or a triggering event. Also they are of low priority. Accordingly, they have been designated continuous as opposed to periodic or event triggered and are executed during a portion of any time remaining after any pending periodic or event tasks are executed. Although an extremely demanding use of the processor for the slow and fast loops of tasks 90 and 92 could conceivably prevent the continuous tasks from ever being executed, typically, the continuous task 96 will receive a substantial portion of the processor time in an acceptably loaded processor.

For the continuous tasks 96, the condition column contains a continuous allocation limit which allocates some percentage of the time that would normally be devoted to continuous tasks to other lower priority tasks 98 such as communications or other system tasks not entered by the programmer but used by the operating system 87.

The operating system 87 establishes its own tasks 100 at higher priorities than the user tasks 90 through 96. Also at a higher priority is the system fault handler task 102. These tasks are shown to establish the range of priorities actually observed by the operating system 87 but do not require any programmer input.

Referring now to FIG. 6, the operating system 87 reviewing the user data from task scheduling table 88 prepares in essence an occurrence queue 104 having one column listing "occurrences" defined as tasks or watchdog timers that are running, the latter which will be described below. Each occurrence is linked to an initiation time value associated with the 32 bit clock word from clock 81 of FIG. 3.

Each periodic task, when placed in the occurrence queue 104 will be associated with an initiation value equal to the current time of the clock 81 plus the period of the task obtained from the task scheduling table 88. More generally, the initiation value associated with a periodic task will be the clock value from clock 81 at the task's last time of execution plus the period of the task obtained from the task scheduling table 88.

Figure 7A:
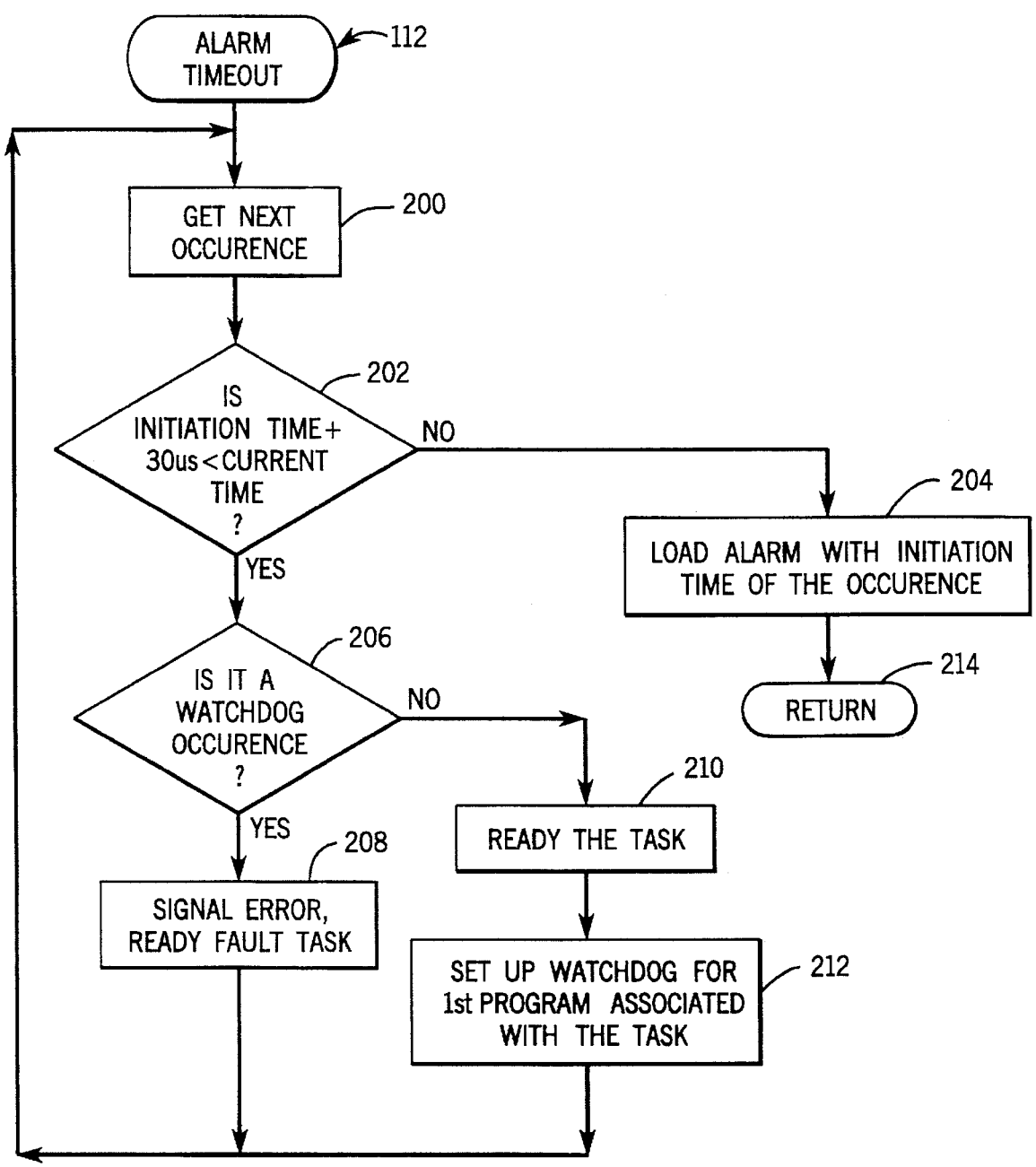
FIGS. 7(a), 7(b) and 7(c) are simplified flow charts of the operating system as it executes on the controller of FIG. 1 to execute periodic and event triggered tasks.
Figures 7B, 8:
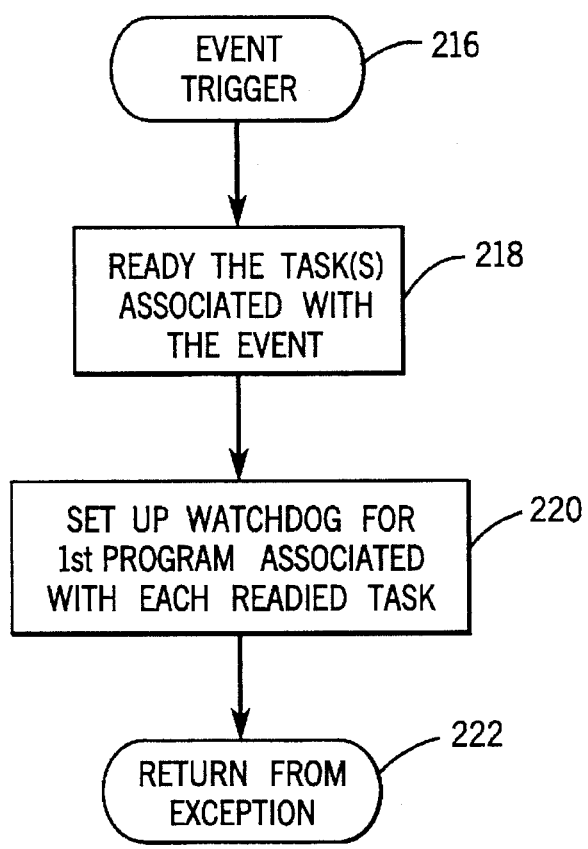
FIG. 8 is table representation of a ready list providing a queue of pending tasks.

When an initiation time for a periodic task is reached, the task is transferred to a ready list 120 shown in FIG. 8 and providing a list of all tasks ready for current execution and their priority. For event driven tasks, the task is not placed in the occurrence queue 104 but moves directly to the ready list 120 when the triggering event occurs.

In either case, upon enrollment of a task in the ready list 120, a watchdog timer occurrence for the first program of that task is entered in the occurrence queue 104. This watchdog initiation time is equal to the initiation time of the task plus the watchdog time value of the first program, as listed in the task scheduling table 88. As each program completes execution, the watchdog timer of the next program associated with the task is entered into the occurrence queue 104.

Under the control of the operating system 87, the subprocessor 76 reviews the occurrence queue 104 to identify all occurrences having initiation times equal to or less than the clock value provided by clock 81 together with those occurrences having starting times within 30 microseconds of the clock value provided by clock 81. These latter occurrences are so close to the earlier occurrences for it to be impractical to treat them as different occurrences under the system.

Thus for example, task 90, the SLOW LOOPS and task 92, the FAST LOOPS shown in the task scheduling table 88 with initiation times of 10274.000 ms and 10274.025 ms would be selected to be readied together. The initiation time of the next occurrence in the occurrence queue 104 is then loaded by the subprocessor into the alarm register 78 of FIG. 3 and the operating system 87 attends to other demands while it awaits an exception signal 89 from the comparator 83.

Referring now to FIGS. 5, 6 and 7(a), for a periodic task, the process of moving tasks from the occurrence queue 104 to the ready list 120 begins at process block 112 where an alarm timeout is received from comparator 83 shown in FIG. 3. As indicated in process block 200, at this time the occurrence queue 104 is reviewed to get the next occurrence, in the order of the occurrences' initiation times.

As indicated by decision block 202, if the next occurrence is ready for execution as indicated by its initiation time, the program proceeds to decision block 206.

At decision block 206, if the occurrence is a watchdog occurrence, indicating that a program associated with a ready task has failed to execute within the required time, the program proceeds to process block 208 and fault flags are set. The appropriate fault task is loaded into the ready list 120.

Otherwise, at decision block 206, if the occurrence is not a watchdog occurrence but a task, the task is readied, as indicated by process block 210, which places the task in the ready list 120, and the program proceeds to process block 212.

At process block 212 a watchdog occurrence for the first program 82 associated with the readied task is entered into the occurrence queue 104.

The operating system then proceeds back to process block 200 and the next occurrence is identified. If at subsequent decision block 202, the next occurrence is not ready for an execution, the program proceeds to process block 204 and the alarm register 78 (FIG. 3) is loaded with the initiation time of that identified next occurrence. The alarm servicing routine of the operating system then exits at block 214.

Tasks, that are of an event type such as task 94, are not triggered by the coincidence of an initiation time and the value of the clock 81 but rather by the receipt of an event signal indicating a change in the input or output identified in the condition column of the task scheduling table 88.

Referring to FIGS. 2 and 3, the detection of a change in an input or output identified in the task scheduling table 88 would normally consume considerable processor time because the processor would be required to almost continuously scan a list of inputs or outputs identified to events to generate the necessary event signal if one those inputs or outputs changed.

In contrast, in the present invention, the responsibility for identifying the events is transferred to the I/O modules 18. In particular, upon initiation of the operating system 87, the processor 62 reads the task scheduling table 88 for event triggered tasks and transmits a message through the backplane 20 to the I/O module 18 causing the I/O module to undertake a review of that event on a periodic basis as required. In this manner, the burden of detecting events is shifted from the subprocessor 76 to the I/O modules. Large control systems with multiple I/O modules 18 will have correspondingly greater resources for detecting multiple events.

Upon detecting an event, the I/O modules 18 send a message having a special character string to the communication processor 58 the character string indicating that the messages signal an event. The message also contains information that allows the controller to identify the event. The task scheduling table 88 identifies the tasks associated with the event. The communication processor 58 provides an exception input 103 to the subprocessor 76 in the same manner as that of the alarm register 78, clock 81 and comparator 83. Only upon occurrence of this exception input is the operating system 87 interrupted to read the message and recognize the particular task that has received a trigger.

Upon receipt of such a trigger, the task associated with the triggering event is placed in the ready list 120 and the watchdog occurrence of its programs are placed in the occurrence queue 104 and receive an initiation time equal to the value of the clock 81 and the watchdog time value.

Specifically, an event trigger, as indicated by process block 216, causes the operating system to immediately ready the task associated with that event by placing it in the ready list 120 as indicated by process block 218 and in a manner similar to previously described process block 210.

A watchdog occurrence for the first program 82 associated with the readied event triggered task is then entered into the occurrence queue 104 as indicated by process block 220 and the program returns at process block 222.

A continuous task, such as task 96 is permanently enrolled on the ready list 120 together with its priority.

Figure 7C:
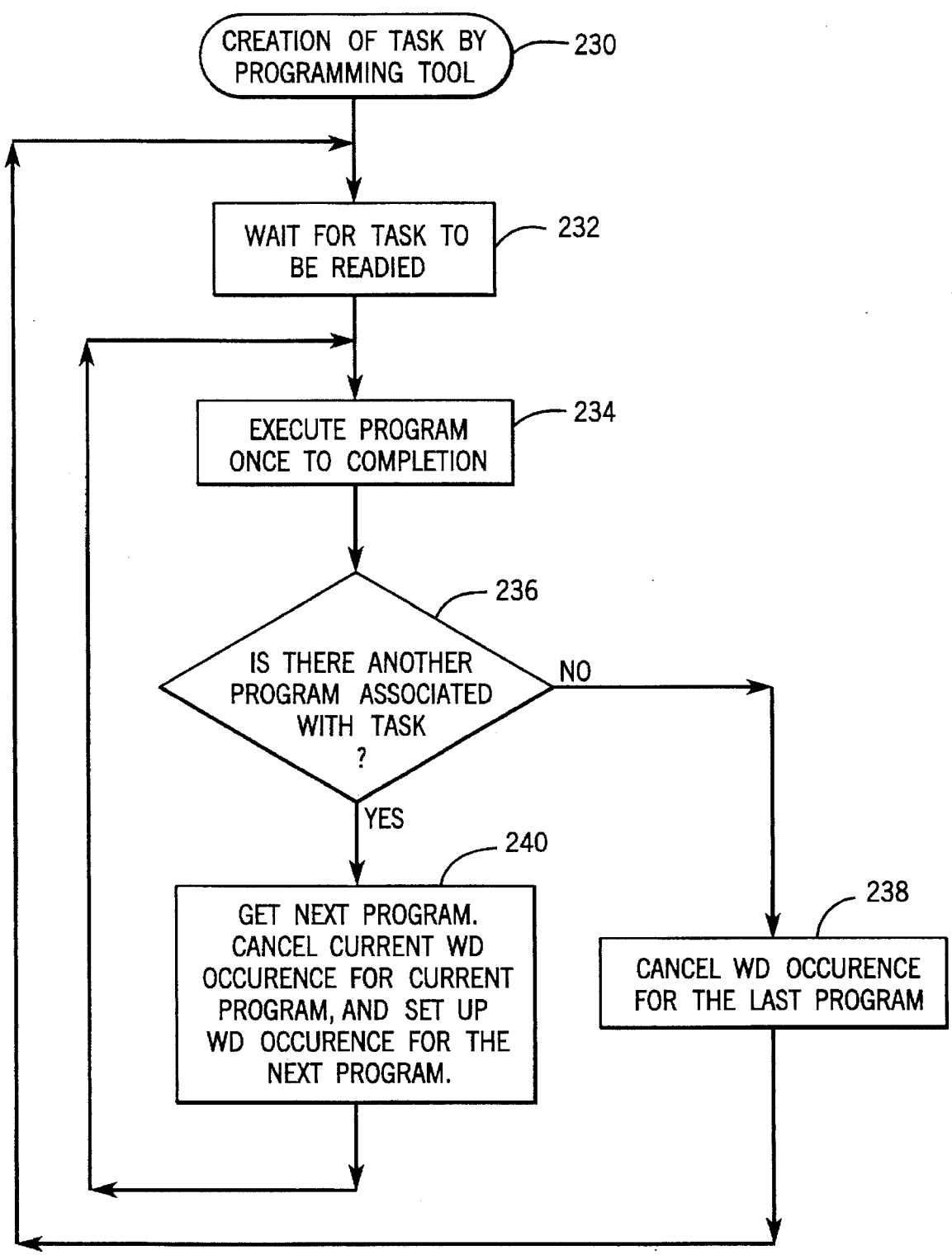

Referring now to FIG. 7(c), the life of a task begins with the entering of task data indicated by process block 230. The operating system then generally waits at process block 232 for entry of the task into the ready list 120 per FIGS. 7(a) and 7(b) as described above. Once a task is readied, the first program of the task is executed once to completion from a starting point to an ending point as indicated by process block 234. At subsequent decision block 236, task scheduling table 88 is consulted to see if there is another program associated with the task. If not, then at process block 238 the watchdog occurrence previously enrolled in the occurrence queue 104 is cancelled and the program returns to process block 232 to wait for the task to be readied again.

If at decision 236, however, there is another program associated with the task, then at process block 240 the next program is loaded, the current watchdog for the program just executed is cancelled and the watchdog for the next program is set up as an occurrence in the occurrence queue 104. The next program is then executed by jumping to process block 234.

This process will continue until there are no more programs associated with the tasks that have not been executed once. At this point the watchdog occurrence for the last program will be cancelled and the task will be readied once again as described with respect to FIGS. 7(a) or 7(b).

As described above with respect to FIG. 7(c), the ready list 120 is examined by the operating system 87 and the highest priority tasks identified. If the highest priority task has a priority higher than a task currently being executed (in yet another system task) then the task being executed is suspended (its values are saved so that it may be run again from the point at which it was suspended) and the new task of higher priority is run. When the task identified as being of higher priority is finished, it is removed from the ready list 120 and the next task of lower priority on the list (suspended or never run) is executed. Thus event tasks of higher priority displace periodic tasks of lower priority, and periodic tasks of higher priority displace event tasks of lower priority. Multiple tasks of the same priority are run on a time slice basis equally sharing the processor without regard to the type of triggering of the task (periodic or event).

The continuous task executes only when there are no other tasks on the ready list 120 due to its having the lowest priority.

Thus the present invention permits a dynamic scheduling of mixed trigger type tasks, both those that occur periodically on a regular basis and those that can occur at any time based on an event occurrence. This ability to integrate both event driven and periodic type tasks permits greater efficiency in the use of the processor by avoiding the need for the processor to execute event driven tasks that are time critical at a high rate when the events are not pending. The use of watchdog times keyed to each program of a task permits this dynamic scheduling to operate in the critical environment of industrial control by providing a clear indication of processor overload and the failure of critical tasks to be promptly executed. In addition to tracking elapsed real-time during the execution of a task, the present invention may also track the actual execution times of each task. These statistics may be used empirically to determine the proper load of the processor or a given control system which vary depending on the actual machinery being controlled.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An industrial controller operating controlled equipment according to a control program divided into at least two tasks each having a starting and completion point, the controller comprising:
   (a) an I/O module receiving electrical inputs from the controlled equipment;
   (b) a control terminal for entering data from the user providing for each task: a task priority, a task characterization as to whether the task is periodic, and thus to be executed to completion regularly according to a time period, or event triggered, and thus to be executed upon occurrence of an event, the event being a change in a predetermined electrical input;
   (c) an electronic memory communicating with the I/O module and the control terminal and storing:
      (i) the at least two tasks of the control program;
      (ii) a task scheduling table receiving the task priority and task characterization from the user;
      (iii) an operating system program;
   (d) an electronic processor communicating with the electronic memory and the I/O module to receive the electrical inputs and operate according to the inputs and the control program, and executing the operating system program to:
      (i) identify a highest priority periodic task requiring current execution based on the task priority and the time period of the task;
      (ii) identify a highest priority event triggered task ready current execution based on the occurrence of its event;
      (iii) if there is no ready event triggered task of higher priority than the highest priority periodic task, execute once to completion the highest priority periodic task;
      (iv) if there is no highest priority periodic tasks of higher priority than the ready event triggered task execute once to completion the ready event triggered task.

2. The industrial controller of claim 1 wherein the electronic processor operating according to the operating system, at steps (iii) and (iv), suspends all tasks of lower priority and wherein steps (i) and (ii) execute repeatedly during the execution of steps (iii) and (iv) to update the highest priority periodic task and the highest priority event triggered task.

3. The industrial controller of claim 1 wherein the data from the user also includes at least one watchdog time value associated with a predetermined portion of each task and wherein the electronic processor provides an error signal:

if a predetermined portion of the highest priority periodic task is not executed once to completion within the watchdog time after execution is begun.

4. The industrial controller of claim 1 wherein the task characterization may also be that the task is continuous, and thus to be executed without occurrence of an event and not regularly according to a time period and wherein the electronic processor executes a task of a continuous type if no tasks of higher priority are being executed in (iii) and (iv).

5. The industrial controller of claim 4 wherein the user data also includes a continuous allocation limit and wherein the electronic processor executes a task of a continuous type for only a portion of the time that no tasks of higher priority are being executed in (iii) and (iv), the portion being determined by the continuous allocation limit.

6. The industrial controller of claim 1 wherein the I/O module includes a module processor operating according to a stored program to (a) receive a portion of the data from the user that identifies the change in an electrical input as the source of an event, (b) monitor the electrical input to detect the occurrence of the event of (a); and (c) provide a signal to the electronic processor indicating the occurrence of the event.

7. The industrial controller of claim 6 wherein the task scheduling table stores data linking the event to more than one task.

8. The industrial controller of claim 6 wherein the task scheduling table stores data linking a task to more than one event.

9. An industrial controller operating controlled equipment according to a control program divided into at least two tasks each having a starting and completion point, the controller comprising:

(a) an I/O module receiving electrical inputs and outputs connected to controlled equipment;

(b) a control terminal for entering data from the user providing scheduling information and a watchdog time value for each task;

(c) an electronic memory communicating with the I/O module and the control terminal and storing:

(i) the at least two tasks of the control program;

(ii) a task scheduling table receiving the data from the user;

(iii) an operating system program controlling the execution of the tasks according to the task scheduling table; and (d) an electronic processor communicating with the electronic memory and the I/O module to receive the inputs and change the outputs, according to the inputs and the control program, and executing the operating system program to:

(i) identify an execution time for each task based on the data from the user;

(ii) execute a portion of each scheduled task at the task's execution time once from the portion's starting point to its completion point;

(ii) generate an error signal if the portion of an executed task does not reach its completion point within the watchdog time value for that portion, after the execution time for that task.

10. An industrial controller operating controlled equipment according to a control program divided into at least two tasks each having a starting and completion point, the controller comprising:

(a) an I/O module receiving electrical inputs and outputs connected to controlled equipment;

(b) a control terminal for entering data from the user providing a fault handler associated with at least a portion of the specific task;

(c) an electronic memory communicating with the I/O module and the control terminal and storing:

(i) the at least two tasks of the control program;

(ii) the fault handler; and (iii) an operating system program controlling the execution of the tasks according to a task scheduling table;

(d) an electronic processor communicating with the electronic memory and the I/O module to receive the inputs and change the outputs, according to the inputs and the control program, the electronic processor generating fault signals indicating a particular computer fault state and executing the operating system program to:

(i) execute one task according to the task scheduling table; and (ii) upon the occurrence of a fault signal during the specific task, execute the fault handler associated with the portion of that task.

11. The industrial controller of claim 10 wherein the electronic processor further operates to:

(iii) clear the fault signal if the fault handler addresses the particular computer fault state; and (iv) if the fault signal is not cleared at (iii), execute a system fault handler associated with all tasks.

12. The industrial controller of claim 11 wherein the electronic processor further operates to:

(v) clear the fault signal if the system fault handler addresses the particular computer fault state;

(iv) cease executing all tasks if the fault signal is not cleared at (v).

* * * * *